United States Patent [19]

Robinson et al.

[11] Patent Number: 5,083,247
[45] Date of Patent: Jan. 21, 1992

[54] FISHING ROD LIGHTING SYSTEM

[76] Inventors: Randolph W. Robinson, R.R. 6, Lindsay, Ontario, Canada, K9V 4R6; John-Willi Weitz, Box 883, Lindsay, Ontario, Canada, K9V 4R6

[21] Appl. No.: 650,029

[22] Filed: Feb. 4, 1991

[30] Foreign Application Priority Data

Feb. 13, 1990 [CA] Canada ................................ 2009972

[51] Int. Cl.⁵ .............................................. F21V 33/00
[52] U.S. Cl. .................................... 362/109; 362/234; 43/17.5
[58] Field of Search ............... 362/109, 157, 253, 234; 43/17.5, 25

[56] References Cited

U.S. PATENT DOCUMENTS

| | | |
|---|---|---|
| 4,026,059 | 5/1977 | Ochs ........................................ 43/17.5 |
| 4,085,437 | 4/1978 | Hrdlicka et al. ....................... 362/109 |
| 4,750,287 | 6/1988 | Myers .................................... 43/17.5 |
| 4,775,920 | 10/1988 | Seibert et al. ......................... 362/109 |

*Primary Examiner*—Stephen F. Husar

[57] ABSTRACT

The invention relates to lighting systems, for fishing rods, which are useful for proper handling and managing of such rods under poor ambient lighting conditions. The lighting system directs light substantially in line with the fishing line and the eyelets on the pole part of the rod, without obstruction, so that all eyelets and the line therethrough may be clearly lighted. In addition light can be directed to the line exit side of the reel, mounted on the handle part of the fishing rod, to assist in untangling or rethreading the line through the reel line guide. The lighting system is also useful for other tasks to be performed under poor ambient light conditions.

8 Claims, 2 Drawing Sheets

FISHING ROD LIGHTING SYSTEM

BACKGROUND OF THE INVENTION

1. Field of the invention

The present invention relates to fishing rods supplied with integrated illuminating means for assisting the fisherman in untangling the fishing line, baiting hooks or performing other manipulations under poor ambient lighting conditions.

2. Description of the prior art

Fishing is a very popular recreational activity and one which, if successful fish catching is the aim, requires the participant to fish under very adverse conditions, i.e. under poor lighting conditions, since it is known that certain fish are most active in their feeding and, consequently most readily hooked, at night. Under poor lighting conditions the fishing line cannot be seen and can become tangled at the reel or wrapped around the end of the rod. It is common practice to carry a light source such as a flashlight, or lantern, but since two hands are normally required for untangling or unwrapping a line, it is difficult to place the light source in a position to project the light in the proper direction.

Many attempts have been made to solve the problem, mentioned above, by providing attached or integrated lighting systems for fishing rods. These attempts have not been very successful since the lighting provided has been insufficient or blocked from illuminating the part of the rod or line where the problem exists. U.S. Pat. No. 4,085,437—T. F. Hrdlicka—issued Apr. 18, 1978 shows a fishing rod with an integrated handle lighting system. The light is incorporated in a translucent handle and light radiates primarily in a forward direction, through the end of the handle, along the flexible pole portion of the rod. However, the pole produces a shadow so that the light is projected in a cone around the pole and does not impinge the pole where it would be most useful, i.e. in the area of the fishing line eyelets. Furthermore it is difficult to supply sufficient light through the handle while, at the same time, providing sufficient handle strength.

U.S. Pat. No. 4,117,618—C. S. Utsler—issued Oct. 3, 1978 discloses a lighted fishing rod where the pole part is translucent and provided with beads, at the locations of the eyelets, to diffuse light at these points. It will be obvious that the amount of light diffused out of the pole at the eyelets will be quite meagre.

U.S. Pat. No. 2,863,251—C. W. Ackerman—issued Dec. 9, 1958 shows a rod with incorporated light sources, one directing light forward underneath the rod and another directing light rearward underneath the rod as well away from the fishing line and eyelets therefor. The lighting system is designed to be switched on when tension is applied to the fishing line.

U. S. Pat. No. 2,565,633—H. E. Scott—issued Aug. 28, 1951 shows a fishing rod with an integrated lighting system which directs light forward from behind the reel.

None of the fishing rod lighting systems, described above, direct light along the fishing line and directly in the area of the eyelets and furthermore, none of the systems provide light, in a rearward direction at the level of the line as it is drawn off the reel.

SUMMARY OF THE INVENTION

The present invention relates to fishing rods with integral lighting systems which overcomes defects in the systems described in the above mentioned U. S. patents and, furthermore, provides lighting means which facilitate the handling of the most difficult problems of night fishing which are the unwrapping and untangling of fishing line at the fishing rod per se.

A particular feature of the present invention is to provide a fishing rod lighting system which is fully integrated in the rod and adapted to direct a beam of light forward along the pole part of the rod and through and around the eyelets so that the fishing line is clearly visible under poor ambient light conditions. This feature is most helpful in the event the line becomes wrapped around the end of the pole or is tangled at or between eyelets.

A further feature of the invention is the provision of a rearward directed light beam emanating from in front of the reel, in close proximity to the line take-off guide, so that it will be available to illuminate the reel when tangling occurs in that vicinity.

A still further feature of the invention is the accommodation of batteries, for the lights, in the handle portion of the fishing rod and a switch, for operating the lights, positioned for easy thumb or finger actuation without changing the hand grip on the handle.

BRIEF DESCRIPTION OF THE DRAWINGS

Other features and advantages of the invention will become apparent as the description proceeds with reference to the cross-sectional accompanying drawings, in which like reference numerals designate like parts and wherein.

DETAILED DESCRIPTION OF THE INVENTION

Figure 1:
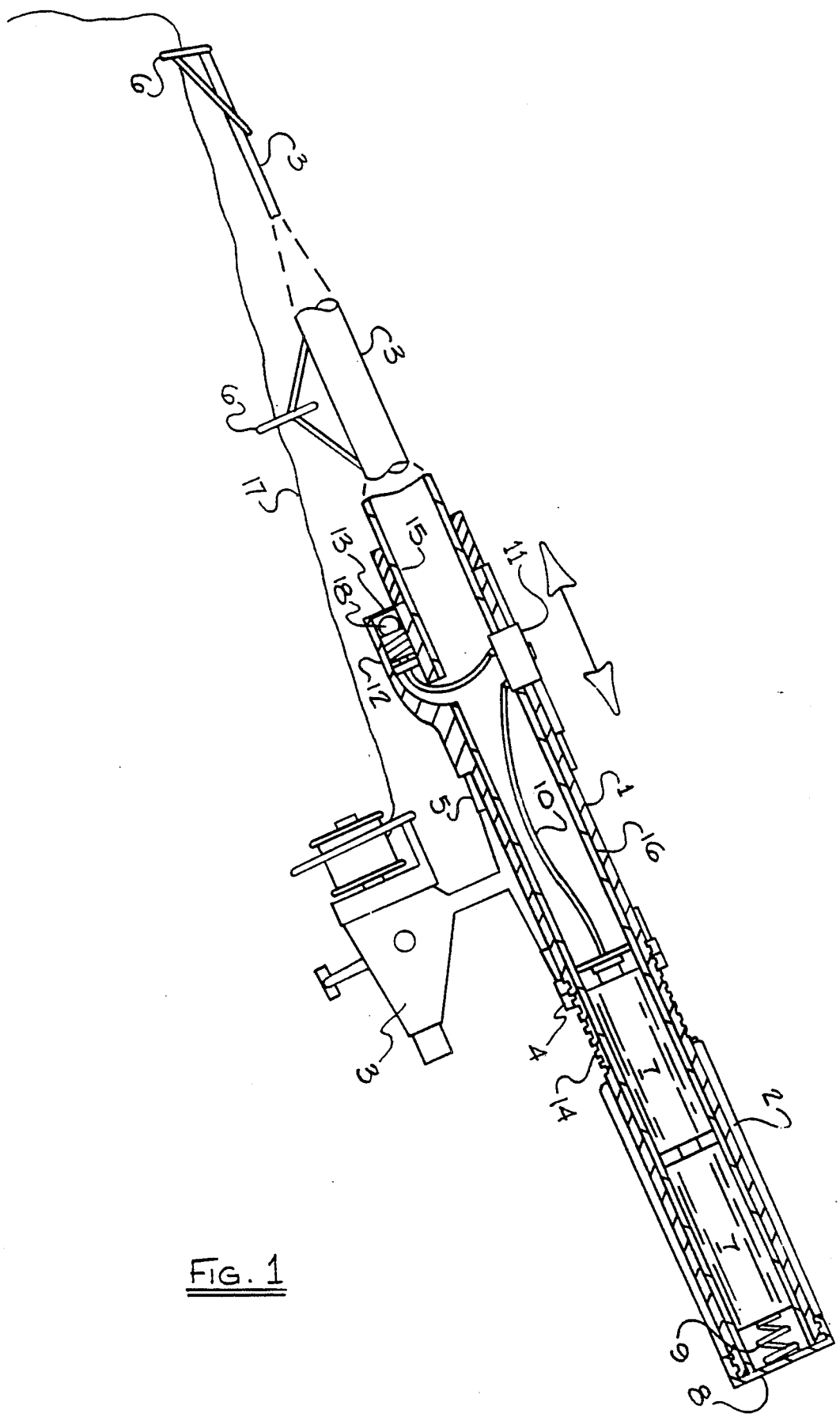
FIG. 1 shows a fishing rod incorporating the lighting system according to the present invention.

Referring now to the drawings, FIG. 1 shows a cross-sectional view of a fishing rod 1, provided with a spinning reel 20, which rod is held in the hand with the reel below the rod when the rod is in the horizontal position. The reel is secured to the rod by ferrules 4,5 of which 4 is provided with internal threads for cooperation with threads 14 provided on the handle of the rod as is well known. For the incorporation of the invention, in a simple manner, it is preferred that the handle of the fishing rod is, at least, internally conductive as would be provided by a metal tube 15. Tube 15 may be provided with a cover 16 of plastic, cork or other material suitable for handling.

Figure 2:
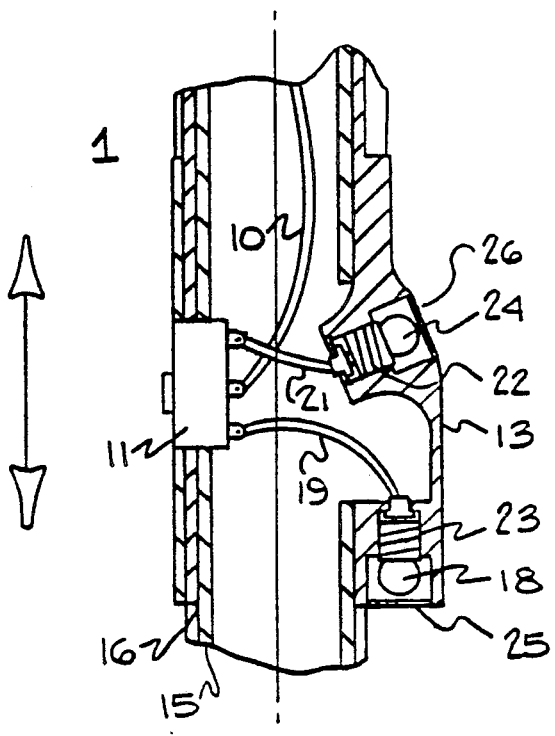
FIG. 2 shows an enlarged view of the portion of the fishing rod, of FIG. 1, incorporating the light and switch therefor and, in addition, a further light for projecting light in the rearward direction.

In accordance with the particular feature of the present invention a light housing 13, shown in greater detail in FIG. 2, is integrated into the rod in a low silhouette manner so that there is very little interference with the fishing line 17 which passes immediately thereover.

Light housing 13 incorporates a pre-focused light source 18 which, without obstruction of rod parts, when energized projects a focused beam of light forward, along the pole part, through and around the fishing line eyelets 6 so that the line and eyelets are clearly visible. It should be noted here that the housing shown in FIG. 2 is a modified version of that of FIG. 1 in that it incorporates the first light source 18, shown in FIG. 1, and a further light source 24 directing light rearward and downward to the line exit side of the reel.

Power for the light source(s) is provide by batteries 7 incorporated in the handle of the rod in a known manner. In order to simplify the wiring the internal surface of the rod 15 is preferably conductive so that it may be utilized as one of the power supply conductors to connect to the outer metal shell of a socket for light source 18. A conductor 10, contacting the centre pole of the battery, in known manner, connects the centre pole to a switch 11 which, in the case of the embodiment shown in FIG. 1, is a single pole switch by means of which the power supply circuit to the light source 18 can be completed. In the modification shown in FIG. 2 switch 11 is shown as a two way switch by means of which light sources 18 and 24 can be selectively energized. If desired a single pole switch may be employed to simultaneously energize both light sources. Since the invention is likely to be used during adverse conditions, it is preferred that the light sources 18, 24 are protected from moisture by lenses 25, 26 respectively.

Figure 3:
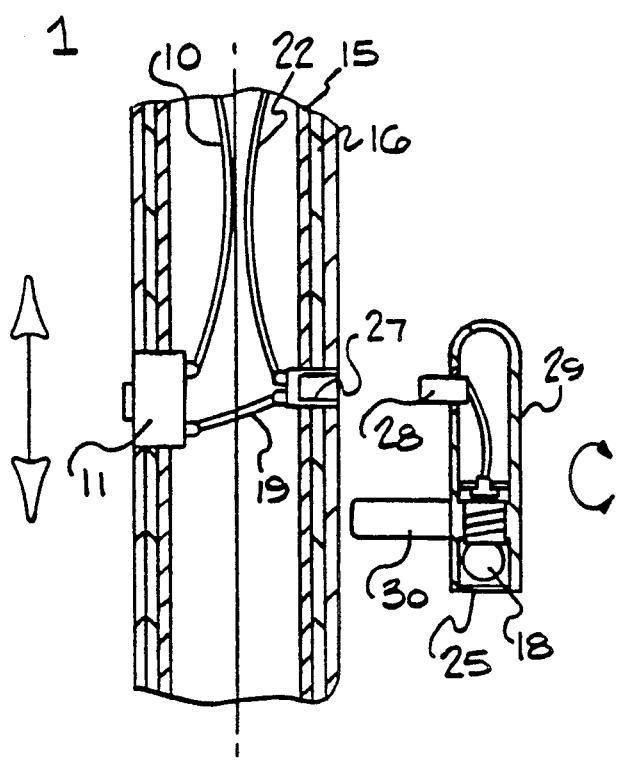
FIG. 3 shows a further embodiment of the invention wherein a rotatable light source, posed for insertion into the rod handle part between the pole and the reel of the rod, is substituted for the fixedly incorporated systems of FIG. 1 and FIG. 2.
Figure 4:
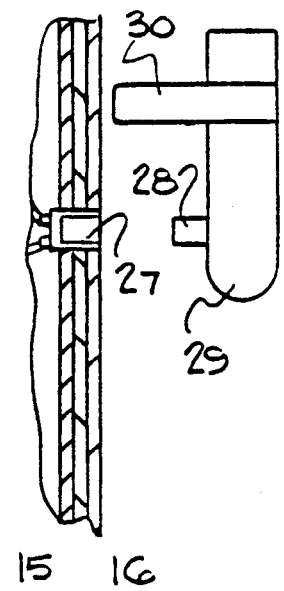
FIG. 4 shows the embodiment of FIG. 3 with the lighting unit per se posed for insertion into the rod for reversing the direction of the light projection to that shown in FIG. 3.

Referring now to FIGS. 3 and 4 a further embodiment of the invention will be described. In this instance the light source 18 is of the plug-in type and comprises a light source housing 29 incorporating a single light source 18 with a protective lens 25. The housing 29 is provided with a contact plug 28 which plugs into a socket 27 provided therefor in the rod handle 1. Power for the light source may be supplied, in known manner, by mating contacts on plug 28 and socket 27. A saddle type clamp 30 is provided on the housing 29 to ensure proper alignment of the light source in forward or backward directions, which directions are alternately obtained by removing and reversing the plug 28 in socket 27. In the forward projecting direction for source 18, light is provided along the fishing line, through and around the line eyelets 6. In the alternate direction light is provided to the line exit side of the line reel 20.

It will now be obvious that the invention provides a lighting source for low ambient lighting conditions by means of which the light is provided directly to the areas as required for the operation to unwrap or untangle the line. Furthermore the light, when directed in the forward direction, along the pole, is useful for rebaiting, threading the line through the eyelets, rehooking or removing a catch from the line. In the reverse direction the light is provided directly to the line exit side of the reel and is useful for line untangling, threading or other similar tasks. When the light sources are provided in accordance with the invention there are no obstructing or shadow producing fishing rod parts which will limit the usefulness of the light being provided.

It should also be obvious that the batteries, for providing the power to the light(s) may be integrated with the light producing means per se or otherwise contained. When such is the case more freedom of light movement can be provided since wiring and/or contacts do not have to be provided in the handle part.

It should be understood that the embodiments described in reference to the drawings are preferable embodiments of the invention and the invention should not be considered as limited thereto. Variations and other arrangements may be made, by those skilled in the art, which do not depart from the spirit and scope of the invention as defined in the appended claims.

I claim:

1. A fishing rod comprising a handle having a grip part and including fixed-position means for mounting a fishing-line reel thereon between the grip part and a pole part, extending forward from the handle, provided with fishing-line eyelets, and light beam producing means on the fishing rod immediately forward of the said fixed-position means and adapted, when energized, to direct a beam of light forward, the optical axis of the beam of light being coincident with a reference line passing centrally through the fishing-line eyelets, to render visible, under poor ambient light conditions, the eyelets and any fishing line passing therethrough.

2. The fishing rod as claimed in claim 1, wherein the light beam producing means is movable to direct the light in a reverse direction.

3. A fishing rod as claimed as claimed in claim 1 wherein the grip part of the handle is hollow and adapted to accommodate a battery power supply therewithin, the light beam producing means being low-silhouette and located on the handle part immediately in front of the reel position and switch means, mounted at the front end of the grip part of the handle, operable to supply battery power to the light beam producing means which provides light to the eyelets and any fishing line accommodated therein.

4. The fishing rod as claimed in claim 3, wherein a further light producing means is mounted on the handle, between the light beam producing means and the reel, to provide, when energized, light to the line exit side and line guide part of a reel mounted at said fixed position for the reel.

5. The fishing rod as claimed in claim 4, wherein the switch means is operable to selectively energize the light producing means.

6. The fishing rod as claimed in claim 3, wherein the light beam producing means is mounted in a socket, provided in the rod, immediately in front of the reel position and is removable and reversible in the socket to direct light in a rearward direction to light the line exit side of a reel mounted at said fixed position.

7. A fishing rod as claimed in claim 1, wherein the grip part of the handle is hollow and accommodate a battery power supply therewithin, the light beam producing means being integrated into the forward part of the handle, between the said fixed position means and the pole part, and adapted to project the beam of light forward coincident with the reference line passing centrally through the eyelets of the pole to light the eyelets and any fishing line accommodated therein and, switch means located on the handle, immediately forward of the grip part, adapted to energize the light beam producing means.

8. The fishing rod as claimed in claim 7, wherein a further light producing means is integrated into the handle in conjunction with the light beam producing means, the further light producing means being adapted, when energized, to direct light to the fishing line exit side of a reel mounted at said fixed position.

* * * * *